US010155630B2

(12) United States Patent
Olson et al.

(10) Patent No.: US 10,155,630 B2
(45) Date of Patent: Dec. 18, 2018

(54) METHOD FOR CLEANING A CONVEYOR BELT IN A CONVEYOR BELT SYSTEM

(71) Applicant: Tetra Laval Holdings & Finance S.A., Pully (CH)

(72) Inventors: Michael Olson, Montrose, MN (US); Nathan Keim, Montrose, MN (US); Kyle Johnson, Chanhassen, MN (US)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 519 days.

(21) Appl. No.: 14/725,439

(22) Filed: May 29, 2015

(65) Prior Publication Data

US 2016/0347553 A1   Dec. 1, 2016

(51) Int. Cl.
*B08B 3/04* (2006.01)
*B65G 45/22* (2006.01)
(Continued)

(52) U.S. Cl.
CPC .............. *B65G 45/22* (2013.01); *B08B 3/041* (2013.01); *B65G 11/088* (2013.01);
(Continued)

(58) Field of Classification Search
None
See application file for complete search history.

(56) References Cited

U.S. PATENT DOCUMENTS

| 4,958,409 | A | 9/1990 | Braeger et al. |
| 6,378,688 | B1 | 4/2002 | Fitzgerald et al. |

(Continued)

FOREIGN PATENT DOCUMENTS

| EP | 2586579 A1 | 5/2013 |
| FR | 2835819 A1 | 8/2003 |

(Continued)

OTHER PUBLICATIONS

Notification of Transmittal of the International Search Report (Forms PCT/ISA/220 and Forms PCT/ISA/210) and the Written Opinion of the International Searching Authority (Forms PCT/ISA/237) dated Jul. 21, 2016, by the European Patent Office in corresponding International Application No. PCT/EP2016/060714. (13 pgs).

*Primary Examiner* — Katelyn B Whatley

(74) *Attorney, Agent, or Firm* — Buchanan Ingersoll & Rooney PC

(57) ABSTRACT

A conveyor belt system comprises a main frame element, a first conveyor belt attached to the main frame element to transport the food product in a first direction, and a second conveyor belt attached to the main frame element to transport the food product in a second direction. The second conveyor belt is below the first conveyor belt, and a chute element is on a shaft that is substantially horizontal and perpendicular relative to the first direction and the second direction The chute element is below the first conveyor belt and above the second conveyor belt, at an outer end position of the first conveyor belt in the first direction. The chute is rotatable around the shaft between a first position, in which the first conveyor belt is in communication with the second conveyor belt via the chute, and a second position, in which such communication is prevented.

10 Claims, 2 Drawing Sheets

(51) Int. Cl.
  *B65G 47/52* (2006.01)
  *B65G 11/08* (2006.01)
  *B65G 11/12* (2006.01)
(52) U.S. Cl.
  CPC ............ *B65G 11/126* (2013.01); *B65G 47/52* (2013.01); *B65G 2201/0202* (2013.01)

(56) References Cited

U.S. PATENT DOCUMENTS

2009/0090595 A1* 4/2009 Cumbria .............. B65G 11/126
  193/23
2013/0104709 A1  5/2013 Rother

FOREIGN PATENT DOCUMENTS

KR  20130102859 A  *  9/2013
KR  20130102859 A     9/2013

* cited by examiner

METHOD FOR CLEANING A CONVEYOR BELT IN A CONVEYOR BELT SYSTEM

TECHNICAL FIELD

The invention relates to a conveyor belt system for transporting a food product.

BACKGROUND ART

In the diary processing for making cheese, large processing machines are used that produce large quantities of cheese. In the processing of curd, conveyor belts are often used to be able to treat the cheese for a period of time under correct environmental conditions. To do so in a space efficient manner, conveyor belts are often stacked on top of each other in the processing machine. In such stacked conveyor belts the curd is normally first provided to the top conveyor belt and when it has been transported to the end of that conveyor belt the curd is shifted to a lower conveyor belt using a slide or chute placed above the lower chute. As the curd reaches the end of the top conveyor belt, it falls onto the chute and gravity makes it slide to the end of the chute and onto the lower conveyor belt.

These large diary processing machines are often continuously run for long time periods in order to optimize the use of the machines. However, they regularly have to be cleaned to meet food safety standards and to avoid any unwanted bacteria growth in the parts of the processing machine that are in contact with the food product that is processed. For that purpose the production is regularly stopped so that all of the parts in the machine may be cleaned. In many machines the cleaning of machine parts are made on site, without the need to dissemble the machine. This is called Cleaning In Place, or CIP.

As cheese processing is a relatively slow process, stopping and emptying a processing machine may take a while. The last cheese product has to be moved along all processing steps and conveyor belts before the machine will be ready for cleaning. Since the cleaning normally is done using chemicals, it is important that parts of the machine that are cleaned are empty before the cleaning is performed so that it is not possible to contaminate the cheese product.

There is thus a need for improving the state of the art to provide better processing machine to reduce the time consumption related to cleaning the processing machine.

SUMMARY

The conveyor belt system disclosed here represents an improvement on the current state of the art, addresses the above problems, and provides an improved conveyor belt system. These and other objects are achieved by a conveyor belt system for transporting a food product. The conveyor belt system comprises a main frame element, a first conveyor belt attached to said main frame element and adapted to transport said food product in a first direction, a second conveyor belt attached to said main frame element and adapted to transport said food product in a second direction, said second conveyor belt being arranged below said first conveyor belt, and a chute element arranged on a shaft being substantially horizontal and perpendicular in relation to said first direction and said second direction, said chute element being arranged below said first conveyor belt and above said second conveyor belt, at an outer end position of said first conveyor belt in said first direction. The chute is rotatable around said shaft between a first position, in which said first conveyor belt is in communication with said second conveyor belt via said chute, and a second position, in which communication between said first conveyor belt and said second conveyor belt is prevented. Since the communication between the first conveyor belt and the second conveyor belt may be closed, the first conveyor belt may be sealed off and cleaned while the second conveyor belt still is running in order to finish the processing of the product being transported by the same. Further, the rotational motion of the chute eliminates the requirement of separate motions for closing the belt openings and deploying a turnaround slide. In an especially preferred embodiment of the invention, the food product consists of curd, such as cheese curd.

The chute may be provided in a rotatable drum and extend through said drum from a first point on the envelope surface of said drum to a second point of the envelope surface of said drum. By providing a drum comprising a chute or some sort or a channel running through the same, the switching between the first position, in which the first conveyor belt is in communication with the second conveyor belt, and the second position, in which communication between the first conveyor belt and the second conveyor belt is prevented, is very easy to perform.

The switch between the two positions may also be automated by, for example, connecting a control unit to the system which controls the rotation of the chute. This way, an automatic transition from production mode to cleaning mode may be performed. The rotation may be automated by means of any one chosen from a motor, electromagnets, hydraulics and/or pneumatics. Naturally, any suitable way of automating such a transition may be used.

The conveyor belt system may further comprise at least one sealing element to seal said second conveyor belt from said first conveyor belt when said chute is in said second position. The seal or seals will create a barrier between the first conveyor belt and the second conveyor belt to ensure that no cleaning chemicals will contaminate the downstream product areas that still are in production mode while the first conveyor belt is in cleaning mode.

The conveyor belt system may further comprise a drainage, wherein said first conveyor belt is in communication with said drainage via said chute when said chute is in said second position. Accordingly, the cleaning products used during cleaning of the first conveyor belt may be flushed out through the chute to the drainage during cleaning of the first conveyor belt.

According to a second aspect, these and other objects are achieved, in full or at least in part, by a method of cleaning a conveyor belt in a conveyor belt system. The conveyor belt system comprises a main frame element, a first conveyor belt attached to said main frame element and adapted to transport said food product in a first direction, a second conveyor belt attached to said main frame element and adapted to transport said food product in a second direction, said second conveyor belt being arranged below said first conveyor belt, a chute element arranged on a shaft being substantially horizontal and perpendicular in relation to said first direction and said second direction, said chute element being arranged below said first conveyor belt and above said second conveyor belt, at an outer end position of said first conveyor belt in said first direction, and at least one sealing element. The method comprises the steps of rotating said chute around said shaft from a first position, in which said first conveyor belt is in communication with said second conveyor belt via said chute, to a second position, in which communication between said first conveyor belt and said second conveyor belt is prevented, sealing said second conveyor belt from said first conveyor belt by means of said at least one sealing element, and cleaning said first conveyor belt. The same advantages as stated above also apply for the second aspect of the invention.

In the method, the step of cleaning said first conveyor belt is performed simultaneously as said food product is transported in said second direction by means of said second conveyor belt. Further, the step of sealing said second conveyor belt from said first conveyor belt by means of said at least one sealing element may be performed by the step of rotating said chute around said shaft from said first position to said second position.

According to a third aspect, these and other objects are achieved, in full or at least in part, by a method of cleaning a conveyor belt in a conveyor belt system. The conveyor belt system comprises a main frame element, a first conveyor belt attached to said main frame element and adapted to transport said food product in a first direction, a second conveyor belt attached to said main frame element and adapted to transport said food product in a second direction, said second conveyor belt being arranged below said first conveyor belt, a chute element arranged on a shaft being substantially horizontal and perpendicular in relation to said first direction and said second direction, said chute element being arranged below said first conveyor belt and above said second conveyor belt, at an outer end position of said first conveyor belt in said first direction, and at least one sealing element. The method comprises the steps of rotating said chute around said shaft from a first position, in which said first conveyor belt is in communication with said second conveyor belt via said chute, to a second position, in which communication between said first conveyor belt and said second conveyor belt is prevented, sealing said second conveyor belt from said first conveyor belt by means of said at least one sealing element, and cleaning said second conveyor belt. The same advantages as stated above also apply for the third aspect of the invention.

In the method according to the third aspect of the present invention, the step of cleaning said first conveyor belt is performed simultaneously as said food product is transported in said first direction by means of said first conveyor belt. Further, the step of sealing said second conveyor belt from said first conveyor belt by means of said at least one sealing element may be performed by the step of rotating said chute around said shaft from said first position to said second position.

A possible cleaning scheme for cleaning the conveyor belt system enabled by the inventive methods and system are thus the following. In normal operation the chute is placed in the first position, in which the first conveyor belt is in communication with the second conveyor belt via the chute. The feeding of the first conveyor belt is stopped. When the last food product has been reached the second conveyor belt, and the first conveyor belt thus is empty, the chute is rotated to a second position, in which communication between the first conveyor belt and the second conveyor belt is prevented. The first conveyor belt may then be cleaned while the second conveyor belt is still transporting food product. When the last food product on the second conveyor belt has left the second conveyor belt, the second conveyor belt may be cleaned. Simultaneously with cleaning the second conveyor belt, the first conveyor belt may be provided with food product again if the cleaning of the first conveyor belt is finished.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise.

BRIEF DESCRIPTION OF THE DRAWINGS

The above objects, as well as additional objects, features and advantages of the present invention, will be more fully appreciated by reference to the following illustrative and non-limiting detailed description of preferred embodiments of the present invention, when taken in conjunction with the accompanying drawings, wherein.

DETAILED DESCRIPTION

Figure 1:
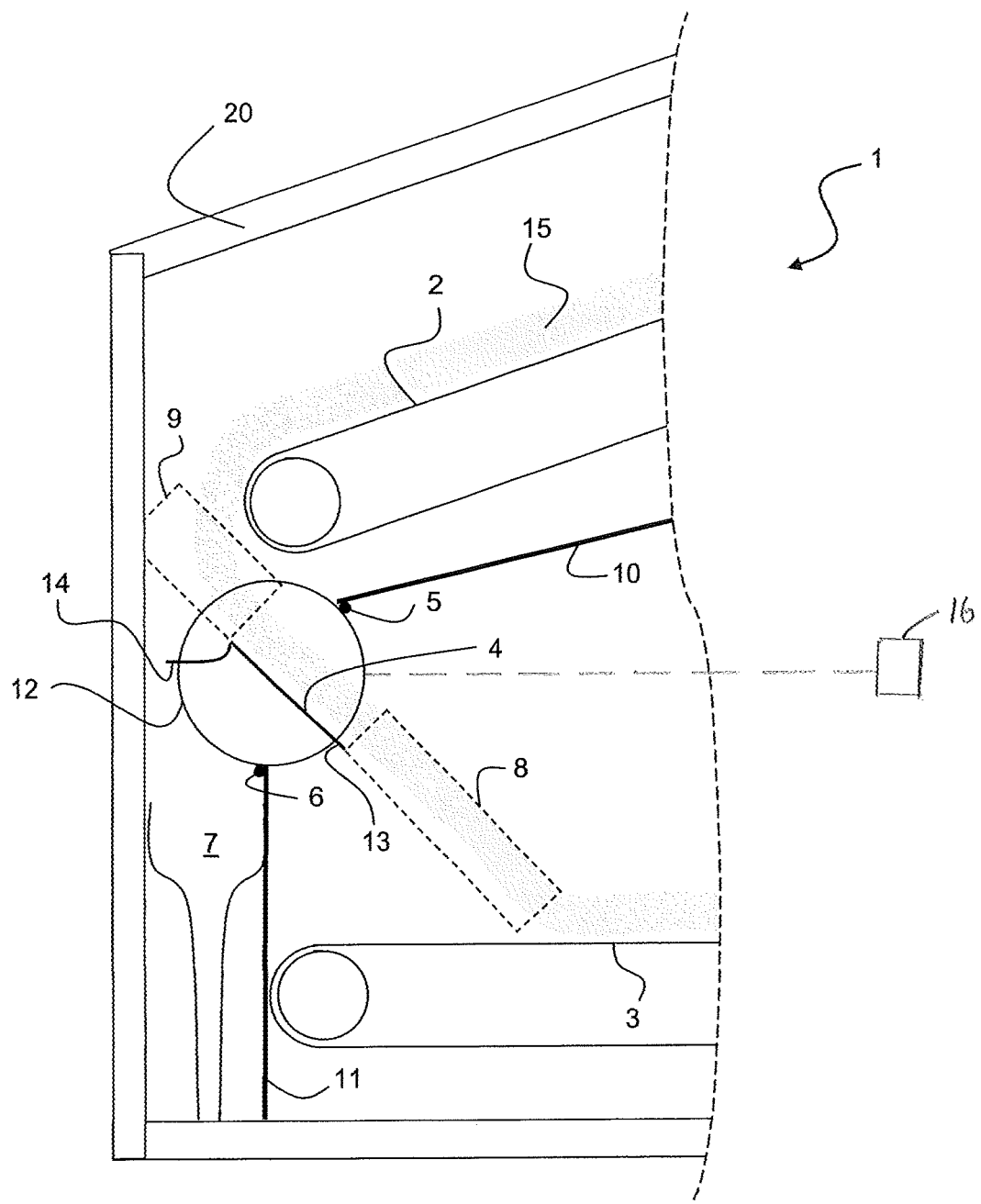
FIG. 1 is a side view of a conveyor belt system when a chute of the system is in a first position.

FIG. 1 shows an embodiment of the conveyor belt system disclosed here. The conveyor belt system 1 is built up by or comprised of a main frame element 20 to which a first conveyor belt 2 and a second conveyor belt 3 are attached. A slide 9, 4, 8 is positioned between the first conveyor belt 2 and the second conveyor belt 3. The slide 9, 4, 8 is built up or comprised of two stationary parts 8, 9 and a chute 4 (chute element) fixedly placed or mounted in a rotatable drum 12 so that also the chute 4 is rotatable together with the drum 12 around the axis of the cylindrical drum 12. The slide 9, 4, 8 is located so that curd 15 that is transported by the first conveyor belt 2 is moved from the first conveyor belt 2 to the second conveyor belt 3.

Figure 2:
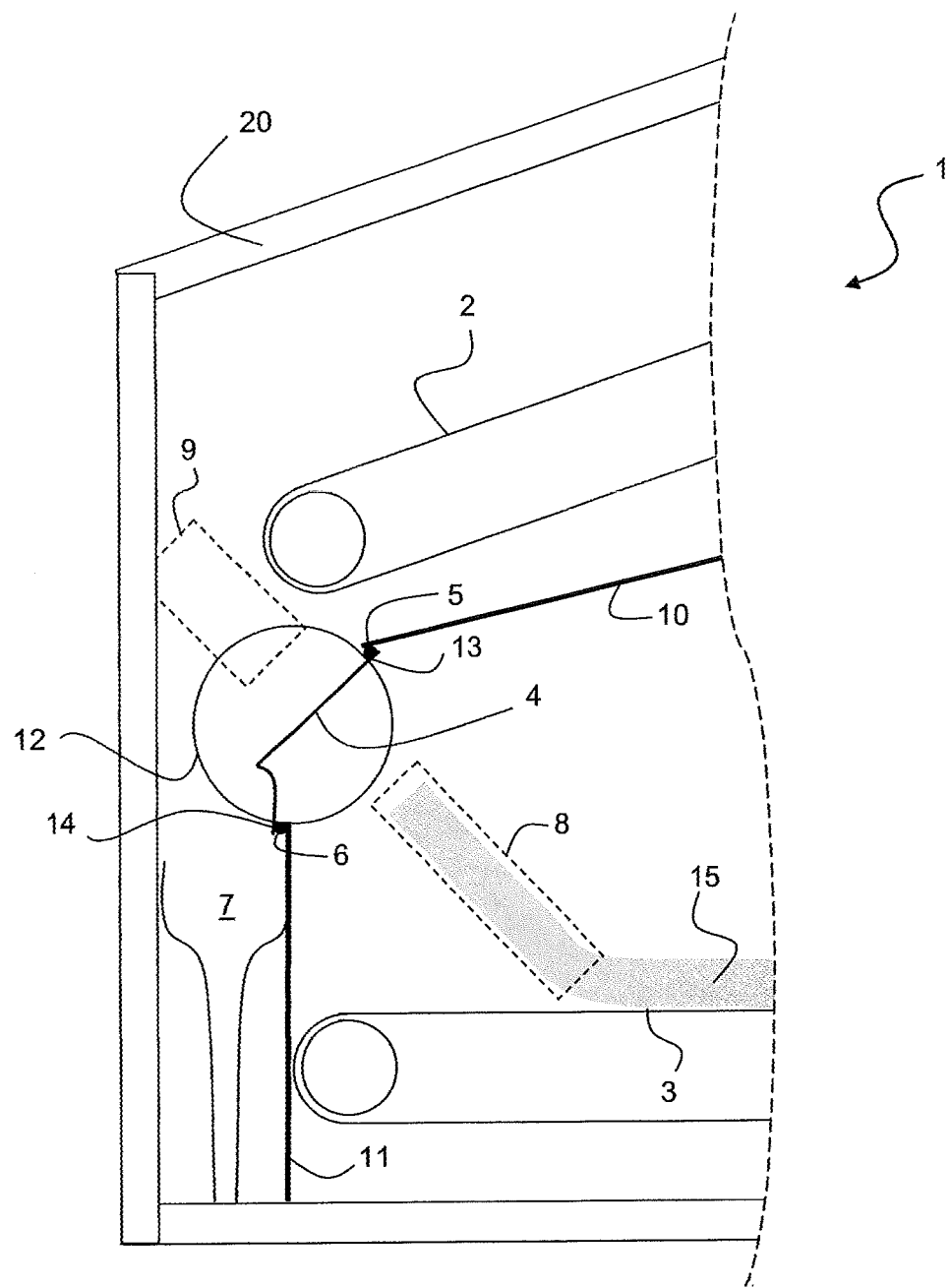
FIG. 2 is a side view of the conveyor belt system when the chute of the system is in a second position.

Referring to FIG. 2, the drum 12 and thus also the chute 4, has been rotated counter clockwise until edges 13, 14 of the chute 4 meet the sealing elements 5, 6. The chute 4 together with the walls 10 and 11 will then seal off the second conveyor belt 3 from the first conveyor belt 2. The first conveyor belt 2 may then be cleaned without the risk of contaminating any remaining food on the conveyor belt 3. The second conveyor belt 3 may thus be continuously used for production while cleaning the first conveyor belt 2.

The chute 4 will, in the closed position as shown in FIG. 2, provide communication from the space of the first conveyor belt 2 to the drain 7. The chute 4 will thus lead liquid used in the cleaning process from the conveyor belt 2 and its surroundings, to the drain.

The cleaning in place (CIP) of the first conveyor belt 2 may thus be performed while still using the second conveyor belt 3 so that cleaning may be initiated before the conveyor belt system 1 is completely empty, thereby reducing the interruption time in the food production. The cleaning in place (CIP) of the second conveyor belt 3 may also be performed while still using the first conveyor belt 3, e.g. when starting up the system after cleaning feeding the first conveyor belt 2 with food product while still cleaning the second conveyor belt 3.

The rotation of the drum 12 and the chute 4 may be performed with an electric motor so that it may be remotely controlled. The rotation may also be automated, enabling a fully automated cleaning process to be initiated while still using the second conveyor belt 3. The automation can be achieved by the electric motor, electromagnets, hydraulics and/or pneumatics. The electric motor, electromagnets, hydraulics and/or pneumatics are schematically identified as 16 in FIG. 1.

The skilled person realizes that a number of modifications of the embodiments described herein are possible without departing from the scope of the invention, which is defined in the appended claims.

The invention claimed is:

1. A method of cleaning a conveyor belt in a conveyor belt system, said conveyor belt system comprising:
    a main frame element,
    a first conveyor belt attached to said main frame element and adapted to transport a food product in a first direction,
    a second conveyor belt attached to said main frame element and adapted to transport said food product in a second direction, said second conveyor belt being arranged below said first conveyor belt,
    a chute element arranged on a shaft that is substantially horizontal and perpendicular in relation to said first direction and said second direction, said chute element being arranged below said first conveyor belt and above said second conveyor belt, at an outer end position of said first conveyor belt in said first direction, and
    at least one sealing element,
    wherein said method comprises:
        rotating said chute element around said shaft from a first position, in which said first conveyor belt is in communication with said second conveyor belt via said chute element, to a second position, in which communication between said first conveyor belt and said second conveyor belt is prevented,
        sealing said second conveyor belt from said first conveyor belt by the at least one sealing element,
        cleaning said first conveyor belt using a liquid cleaning product while the at least one sealing element seals the second conveyor belt from the first conveyor belt, and
        directing the liquid cleaning product and remaining food product on the first conveyor belt vertically downward to a drain using the rotated chute element that is sealing the second conveyor belt from the first conveyor belt so that the liquid cleaning product and the remaining food product are prevented from reaching the second conveyor belt, the drain being spaced apart from the first conveyor belt in the first direction.

2. The method according to claim 1, wherein the cleaning of said first conveyor belt is performed simultaneously as said food product is transported in said second direction by said second conveyor belt.

3. The method according to claim 1, wherein the sealing of said second conveyor belt from said first conveyor belt by the at least one sealing element is performed by rotating said chute element around said shaft from said first position to said second position.

4. The method according to claim 1, further comprising:
    supplying the food product on the first conveyor belt and conveying the food products in the first direction while the chute element is in the first position before the rotating of the chute element, and
    halting the supplying of the food product on the first conveyor belt after the rotating of the chute element.

5. The method according to claim 1, wherein the first direction is opposite to the second direction.

6. A method of cleaning a conveyor belt in a conveyor belt system, said conveyor belt system comprising:
    a main frame element,
    a first conveyor belt attached to said main frame element and adapted to transport a food product in a first direction,
    a second conveyor belt attached to said main frame element and adapted to transport said food product in a second direction, said second conveyor belt being arranged below said first conveyor belt,
    a chute element arranged on a shaft that is substantially horizontal and perpendicular in relation to said first direction and said second direction, said chute element being arranged below said first conveyor belt and above said second conveyor belt, at an outer end position of said first conveyor belt in said first direction, and
    at least one sealing element,
    wherein said method comprises:
        rotating said chute element around said shaft from a first position, in which said first conveyor belt is in communication with said second conveyor belt via said chute element, to a second position, in which communication between said first conveyor belt and said second conveyor belt is prevented,
        sealing said second conveyor belt from said first conveyor belt by the at least one sealing element, and
        cleaning said second conveyor belt using a liquid cleaning product, and
        directing remaining food product on the first conveyor belt vertically downward to a drain using the rotated chute element that is sealing the second conveyor belt from the first conveyor belt so that the remaining food product is prevented from reaching the second conveyor belt, the drain being spaced apart from the first conveyor belt in the first direction.

7. The method according to claim 6, wherein the cleaning of said second conveyor belt is performed simultaneously as said food product is transported in said first direction by said first conveyor belt.

8. The method according to claim 6, wherein the sealing said second conveyor belt from said first conveyor belt by said the at least one sealing element is performed by rotating said chute element around said shaft from said first position to said second position.

9. The method according to claim 6, further comprising:
    supplying the food product on the first conveyor belt and conveying the food products in the first direction while the chute element is in the first position before the rotating of the chute element, and
    halting the supplying of the food product on the first conveyor belt after the rotating of the chute element.

10. The method according to claim 6, wherein the first direction is opposite to the second direction.

* * * * *